United States Patent [19]
Beaman et al.

[11] Patent Number: 5,898,857
[45] Date of Patent: *Apr. 27, 1999

[54] METHOD AND SYSTEM FOR INTERFACING AN UPGRADE PROCESSOR TO A DATA PROCESSING SYSTEM

[75] Inventors: Daniel Paul Beaman, Austin; Gary Dale Carpenter, Pflugerville; Mark Edward Dean, Austin; Wendel Glenn Voigt, Pflugerville, all of Tex.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/354,701
[22] Filed: Dec. 13, 1994
[51] Int. Cl.$^6$ ............................ G06F 13/00; G06F 15/177
[52] U.S. Cl. ............................................. 395/500
[58] Field of Search ............................ 395/309, 500

[56] References Cited

U.S. PATENT DOCUMENTS

| | | | |
|---|---|---|---|
| 4,214,302 | 7/1980 | Schmidt | 395/500 |
| 4,716,527 | 12/1987 | Graciotti | 395/500 |
| 4,987,529 | 1/1991 | Craft et al. | |
| 4,999,769 | 3/1991 | Costes et al. | 364/200 |
| 5,113,369 | 5/1992 | Kinoshita | 395/325 |
| 5,162,979 | 11/1992 | Anzelone et al. | 361/415 |
| 5,253,358 | 10/1993 | Thoma, III et al. | 395/500 |
| 5,255,376 | 10/1993 | Frank | 395/325 |
| 5,257,391 | 10/1993 | DuLac et al. | 395/800 |
| 5,265,211 | 11/1993 | Amini et al. | 395/325 |
| 5,291,614 | 3/1994 | Baker et al. | 395/800 |
| 5,313,231 | 5/1994 | Yin et al. | 345/199 |
| 5,313,595 | 5/1994 | Lewis et al. | 395/325 |
| 5,313,648 | 5/1994 | Ehlig et al. | 395/800 |
| 5,448,704 | 9/1995 | Spaniol et al. | 395/310 |
| 5,649,162 | 7/1997 | Klein et al. | 395/500 |

FOREIGN PATENT DOCUMENTS

| | | |
|---|---|---|
| 0 026 083 A1 | 4/1981 | European Pat. Off. . |
| 0 440 452 A2 | 1/1991 | European Pat. Off. ........ G06F 13/40 |
| 0 470 570 A2 | 8/1991 | European Pat. Off. ........ G06F 9/355 |
| 0 483 959 A2 | 8/1991 | European Pat. Off. . |
| 0 480 417 A2 | 4/1992 | European Pat. Off. . |
| 0 480 417 A3 | 4/1992 | European Pat. Off. . |
| WO 93/12486 | 6/1993 | European Pat. Off. . |

Primary Examiner—Kevin J. Teska
Assistant Examiner—Ayni Mohamed
Attorney, Agent, or Firm—Volel Emile; Brian F. Russell; Andrew J. Dillon

[57] ABSTRACT

A data processing system is disclosed which includes a first processor having an m-byte data width, an n-byte data bus, where n is less than m, and a second processor electrically coupled to the bus which performs bus transactions utilizing n-byte packets of data. An adaptor is electrically coupled between the first processor and the bus which converts n-byte packets of data input from the bus to m-byte packets of data, and converts m-byte packets of data input from the first processor to n-byte packets of data, thereby enabling the first processor to transmit data to and receive data from the bus utilizing m-byte packets of data. In a second aspect of the present invention, a method and system are provided for arbitrating between two bus masters having disparate bus acquisition protocols. In response to a second bus master asserting a bus request when a first bus master controls the bus, control of the bus is removed from the first bus master. Thereafter, in response to a signal transmitted from an arbitration control unit to the first bus master instructing the first bus master to terminate its bus transactions, control of the bus is granted to the second bus master. In response to the second bus master terminating its bus request, control of the bus is granted to the first bus master and a signal is transmitted from the arbitration control unit to the first bus master acknowledging the grant of control.

11 Claims, 4 Drawing Sheets

METHOD AND SYSTEM FOR INTERFACING AN UPGRADE PROCESSOR TO A DATA PROCESSING SYSTEM

BACKGROUND OF THE INVENTION

1. Technical Field

The present invention relates in general to a method and system for data processing and in particular to a method and system for interfacing an upgrade processor to a data processing system having a disparate data path width. Still more particularly, the present invention relates to a method and system for interfacing a upgrade processor which processes transactions in m-byte packets of data to a data processing system which performs transactions utilizing n-byte packets of data.

2. Description of the Related Art

Since the advent of personal computers, designers and manufacturers have sought to enhance the performance and prolong the useful life of their machines. One familiar technique which enhances both the performance and longevity of a personal computer is to upgrade the personal computer by installing an upgrade processor. Thus, if a user is satisfied with the performance of the other components within the personal computer system, the user may enjoy the enhanced performance of a new processor without the expense of replacing the remainder of the personal computer system. For example, as is well-known in the art, a user may upgrade a 486 personal computer operating at 33 MHz to a 66 MHz machine by replacing the standard 486 processor with a 486 DX2 processor.

Although it is advantageous for a user to be able to upgrade a personal computer in the above described manner, the requirement that the upgrade processor be compatible with the personal computer system can stifle innovation in processor architectures. In order to remain compatible with existing hardware and software, manufacturers often retain instruction sets and signaling protocols which may not provide optimal performance. For example, recent technological advances have made reduced instruction set (RISC) processors more advantageous than traditional complex instruction set (CISC) processors in many applications. When CPUs were much faster than memory, it was advantageous for processors to perform multiple operations per instruction since processors would otherwise waste cycle time waiting for the memory to deliver instructions. Now that CPU speed and memory access time have become more balanced, RISC architecture has become more feasible, assuming that the memory hierarchy is able to deliver one instruction plus data each cycle. Other recent advances in state-of-the-art processor architecture include the incorporation of on-chip interconnection and memory utilizing VLSI fabrication techniques and the increase of the data path width of processors from 32 to 64 bits. Although processors incorporating these advances in CPU technology provide greatly enhanced performance, they are not readily available for use as upgrade processors since they are often incompatible with existing computer systems.

It is known in the art to upgrade a personal computer system having a 32-bit processor and a 32-bit data bus with an 64-bit processor or a 32-bit processor with a 64-bit data path. In one technique, the 64-bit processor is directly connected to the 32-bit data bus and reads data in serial 32-bit packets. In a second upgrade system, the 64-bit processor is interfaced to two parallel 32-bit buses. As with the first technique, in the second, data is still input to the 64-bit processor in two 4-byte packets, rather than a true 8-byte format. With either interface technique, the computer system does not receive the full benefit of the enhanced performance of the 64-bit upgrade processor bus since processor cycle time is consumed by either additional bus cycles or internal data formatting. Consequently, it would be desirable to provide a method and system for efficiently interfacing a processor which performs transactions utilizing m-byte packets of data with a personal computer system which performs transactions utilizing n-byte packets of data where n<m.

A second issue that must be addressed when interfacing a upgrade processor to a personal computer system is the scheme employed to arbitrate between the upgrade processor and bus master devices within the personal computer system for ownership of the system bus. Determining an efficient arbitration scheme is complicated by the fact that the upgrade processor may have a different arbitration protocol from that of the personal computer system if their architectures are dissimilar. For example, some processor architectures, such as the x86 architecture, can utilize a uni-directional (asynchronous) bus acquisition protocol, in which the requesting bus master expects to receive control of the system bus after asserting a request signal. In other architectures, bus masters utilize a bi-directional handshake bus acquisition protocol in which both a request signal by a second bus master and an acknowledge signal from the arbiter are required before the second bus master assumes control of the bus from the first bus master. Prior art systems do not support interfacing upgrade processors in personal computer systems which have incompatible arbitration protocols. Consequently, it would be desirable to provide a method and system for interfacing an upgrade processor to a personal computer system which utilizes a dissimilar arbitration protocol.

SUMMARY OF THE INVENTION

It is therefore one object of the present invention to provide a method and system for improved data processing.

It is another object of the present invention to provide a method and system for interfacing an upgrade processor and a data processing system which have disparate data paths.

It is yet another object of the present invention to provide a method and system for interfacing an upgrade processor which processes data in m-byte data packets to a data processing system which performs transactions utilizing n-byte packets of data.

It is still another object of the present invention to provide a method and system for interfacing an upgrade processor to a data processing system which utilizes a dissimilar bus arbitration protocol.

The foregoing objects are achieved as is now described. A data processing system is disclosed which includes a first processor having an m-byte data width, an n-byte data bus, where n is less than m, and a second processor electrically coupled to the bus which performs bus transactions utilizing n-byte packets of data. An adaptor is electrically coupled between the first processor and the bus which converts n-byte packets of data input from the bus to m-byte packets of data, and converts m-byte packets of data input from the first processor to n-byte packets of data, thereby enabling the first processor to transmit data to and receive data from the bus utilizing m-byte packets of data.

In a second aspect of the present invention, a method and system are provided for arbitrating between two bus masters having disparate bus acquisition protocols. In response to a second bus master asserting a bus request when a first bus master controls the bus, control of the bus is removed from the first bus master. Thereafter, in response to a signal transmitted from an arbitration control unit to the first bus master instructing the first bus master to terminate its bus transactions, control of the bus is granted to the second bus master. In response to the second bus master terminating its bus request, control of the bus is granted to the first bus master and a signal is transmitted from the arbitration control unit to the first bus master acknowledging the grant of control.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
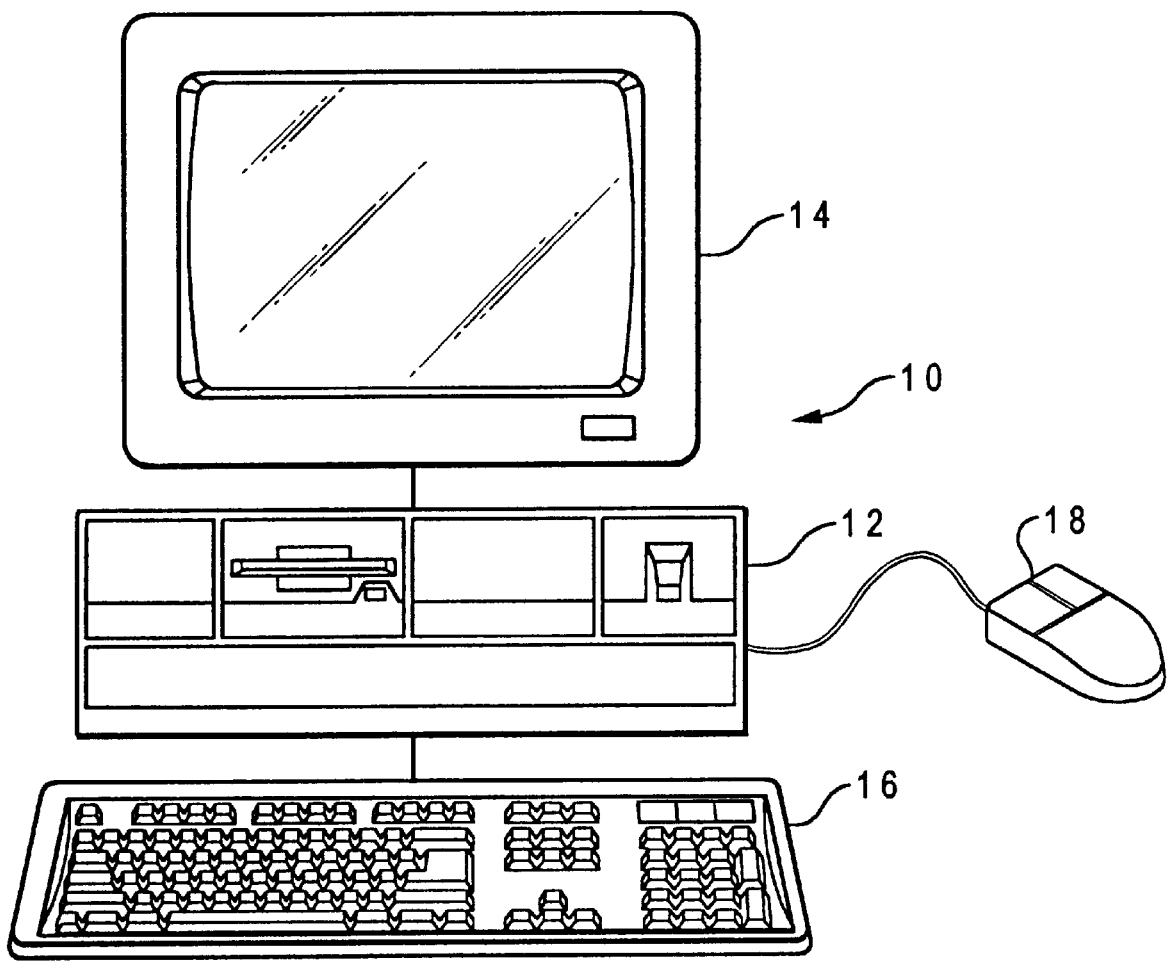
FIG. 1 illustrates a data processing system utilizing the method and system of the present invention.

With reference now to the figures, and in particular with reference to FIG. 1, there is illustrated a data processing system which utilizes the method and system of the present invention. Data processing system 10 comprises processing unit 12, display device 14, keyboard 16, and mouse 18. As is well-known in the art, a user may input data to data processing system 10 utilizing keyboard 16 or mouse 18. Data processing system 10 outputs data to a user via display device 14. In a preferred embodiment of the present invention, processing unit 12 comprises a personal computer designed to utilize a 32-bit 80x86 CISC processor, such as an IBM Personal System 2 (PS/2) Model 77. According to the present invention, the performance of data processing system 10 is enhanced by replacing the CPU within processing unit 12 with an upgrade processor.

Figure 2:
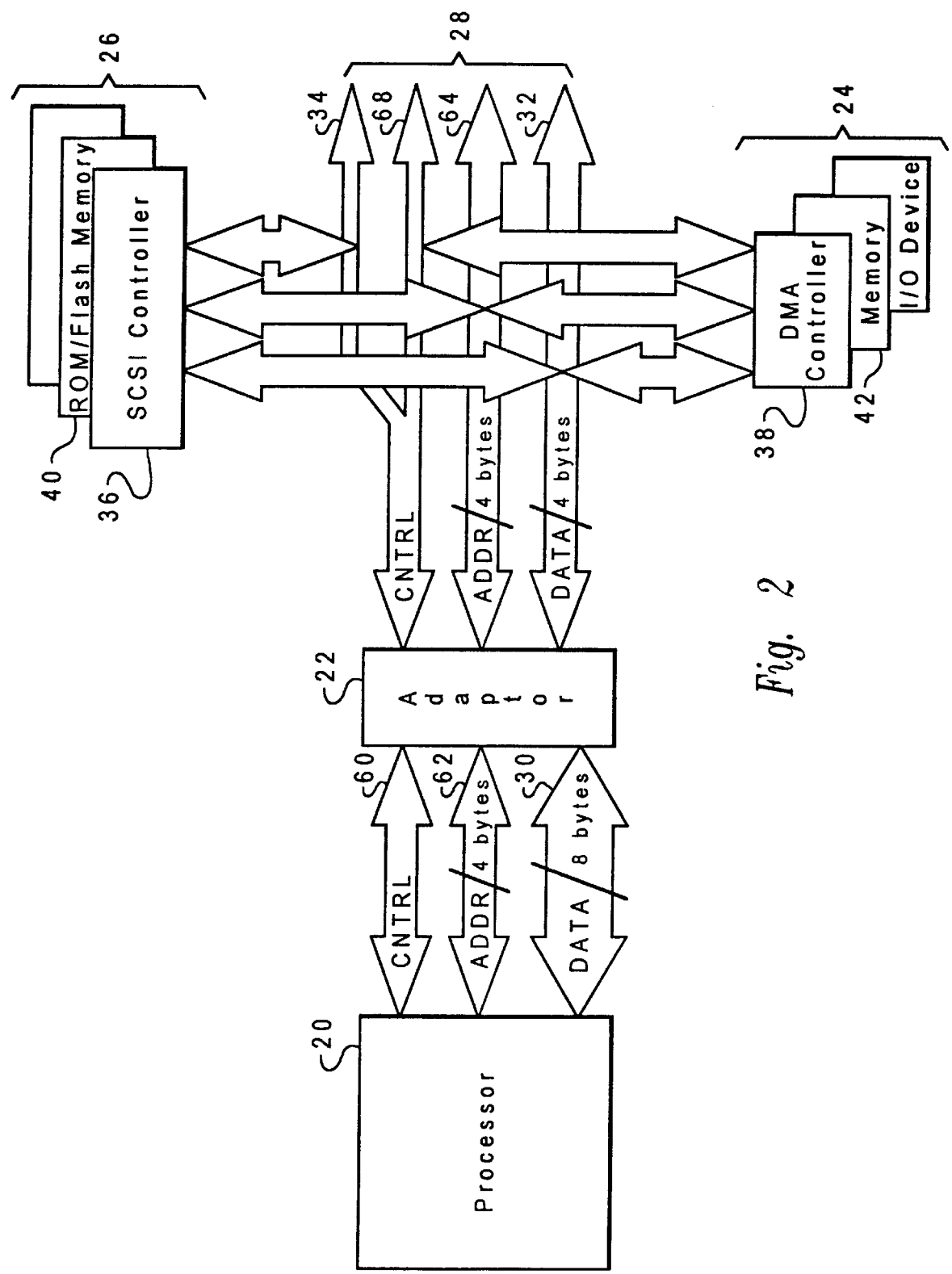
FIG. 2 depicts a block diagram of the processing unit of the data processing system of FIG. 1.

Referring now to FIG. 2, there is depicted a block diagram of processing unit 12. As illustrated, processing unit 12 comprises processor 20, adaptor 22, x86 compatible devices 24, additional devices 26 and hybrid bus 28.

According to a preferred embodiment of the present invention, the performance of processing unit 12, a system designed to utilize a 32-bit 80x 86 bus compatible CISC processor, is enhanced by replacing the standard 32-bit 80x86 bus compatible CISC processor with processor 20, which in a preferred embodiment is a PowerPC™ RISC processor with a 60x bus interface, such as PowerPC 601, PowerPC 603, PowerPC 604, etc. The present invention includes two aspects. First, the present invention provides a method and system for interfacing an upgrade processor to a computer system having a disparate data path width.

Second, the present invention provides a method and system for arbitrating for control of the system bus between multiple bus masters with disparate bus acquisition protocols.

To simplify the interface between processor 20 and x86 compatible devices 24, the bus of processor 20 and the x86 compatible system bus of processing unit 12 are connected as a single bus, referenced as hybrid bus 28. As illustrated hybrid bus 28 supports both x86 compatible devices 24 and additional devices 26, which include SCSI controller 36 and ROM 40. In a preferred embodiment of the present invention, SCSI controller 36 is implemented utilizing an NCR 53C720; however, those skilled in the art will recognize that other suitable SCSI controllers could be utilized. To support both types of devices, hybrid bus 28 remains electrically compatible with x86 devices, but includes some signals which have been redefined from their original x86 usage. For example, according to the x86 signal definition, asserting control signal A20M instructs an x86 processor to emulate the address wrap around at 1 Mbyte that occurs on the 8086 processor. In the preferred embodiment of the present invention illustrated in FIG. 3, the state of A20M indicates whether processor 20 is utilizing a big endian (most significant byte first) or little endian (least significant byte first) data convention. In addition, hybrid bus 28 also differs from a standard x86 compatible bus in that it provides sideband control signals 34, utilized to control additional devices 26. Among sideband control signals 34 are the arbitration signals utilized to arbitrate between processor 20 and SCSI controller 36, as will be described with reference to FIG. 4.

As illustrated in FIG. 2, processor 20 is interfaced to hybrid bus 28 via adaptor 22. As will be described in conjunction with FIG. 3, adaptor 22 converts transactions performed upon data bus 32 to 8-byte packets of data, which are transmitted to processor 20 via data lines 30. In addition, adaptor 22 converts 8-byte packets of data input from processor 20 into 4-byte packets of data, which may be transmitted on data bus 32. Thus, unlike prior art systems which interface an 8-byte processor to a 4-byte computer system utilizing either a single or two parallel 4-byte buses, the present invention provides a method and system for interfacing a processor having an 8-byte data path to a 4-byte data bus which enable the processor to perform transactions on the data bus utilizing 8-byte packets of data.

According to the second aspect of the present invention, the system depicted in FIG. 2 also supports arbitration for control of the single system bus between multiple bus masters having disparate bus acquisition protocols. As will be described in greater detail with reference to FIG. 4, the present invention provides a method and system for arbitrating between processor 20 and SCSI controller 36, both of which have bi-directional bus acquisition protocols, and DMA controller 38, which has a uni-directional bus acquisition protocol.

Figure 3:
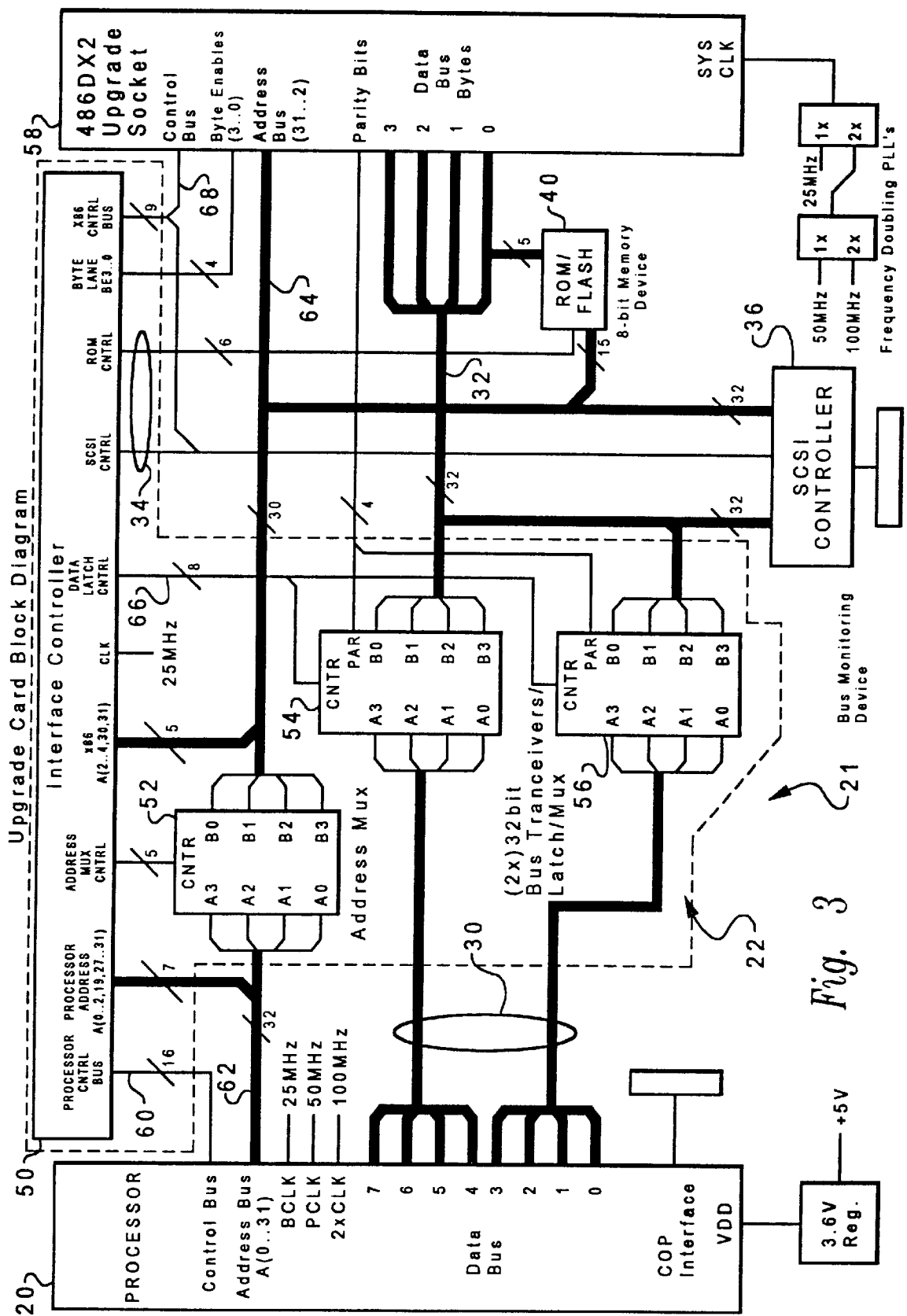
FIG. 3 illustrates a block diagram of a preferred embodiment of an upgrade card utilized to interface an upgrade processor to a data processing system according to the present invention.

With reference now to FIG. 3, there is illustrated a block diagram of a preferred embodiment of an upgrade card utilized to interface an upgrade processor to data processing system 10 of FIG. 1. As illustrated, upgrade card 21 includes processor 20, adaptor 22, SCSI controller 36, and ROM 40. Adaptor 22 comprises interface controller 50, address mux 52, and data latches 54 and 56. Upgrade card 21 is mechanically connected to hybrid bus 28 of processing unit 12 via upgrade socket 58.

Interface controller 50, which in a preferred embodiment of the present invention is an electrically-erasable programmable logic array (EEPLA), such as the AMD MACH230-

15JC, provides the logic means necessary to control the operation of address mux 52 and data latches 54 and 56. By utilizing an EEPLA, the control logic of the interface of the present invention is realized within a single device, thus minimizing the number of required components. However, those skilled in the art will appreciate that in other embodiments of the present invention the control logic could be realized utilizing a combination of suitable logic devices or an ASIC.

Address mux 52 and data latches 54 and 56 comprise 32-bit devices which function as transceivers, multiplexers, and latches. Data may be input to or output from either data lines A0–A3 or B0–B3 of address mux 52 and data latches 54 and 56. In addition, a selected input data byte may be "steered" to any output data line in response to control signals from interface controller 50. Address mux 52 and data latches 54 and 56 also function as latches since input data are stored within the devices and may be selectively output in response to control signals from interface controller 50. In the preferred embodiment illustrated in FIG. 3, address mux 52 and data latches 54 and 56 are implemented utilizing National Semiconductor 74ACTQ-3283T; however, those skilled in the art will appreciate that the functions of address mux 52 and data latches 52 and 54 could be realized utilizing a combination of other suitable components.

Data transfer between processor 20 and the devices connected to hybrid bus 28 may be accomplished in either a single beat mode or a burst mode. When data is transferred in single beat mode in data processing systems in which the processor has the same data width as the system bus, the processor reads or writes a single packet of data in a single bus transaction comprised of an address and a data tenure. When operating in burst mode, a processor reads or writes multiple packets of data in successive bus cycles for a single transaction on the bus comprised of one address tenure and multiple data tenures. Since in the present invention processor 20 has a greater data width than hybrid bus 28, additional beats on hybrid bus 28 are required to complete data transfers to and from processor 20. However, the transfers still require only a single beat of processor 20 to read each packet of data. To illustrate both modes of data transfer, examples of single beat and burst mode reads from system memory will now be described.

When processor 20 requires a single 8-byte packet of data from system memory, referenced as memory 42 in FIG. 2, processor 20 initiates the load operation by transmitting a transaction start (TS) signal to interface controller 50 via processor control bus 60 along with a valid transaction code identifying the transaction as a load from system memory. Interface controller 50 then performs two single beat 4-byte loads from the address within memory 42 driven by processor 20 on address lines 62. Each beat begins with interface controller 50 asserting the address status signal (ADS) to indicate that a valid address and bus cycle definition are present. Memory 42 then reads the address transmitted by interface controller 50 on address bus 64 and responds by presenting valid data from the specified address on its data pins. Memory 42 then signals interface controller 50 that the data is valid to read by transmitting a ready (RDY) signal. Next, interface controller 50 instructs one of data latches 54 or 56 to latch the data by transmitting control signals via data latch control bus 66. The process is then repeated for a second beat on hybrid bus 28 so that data latches 54 and 56 hold a full 8-byte doubleword. During the second beat, interface controller 50 toggles the least significant address bit (A2 of address bus 64) to access the 4-byte data packet subsequent to the target address driven on address lines 62 by processor 20.

As mentioned above, interface controller 50 determines which of data latches 54 and 56 latches the data. In embodiments of the present invention in which processor 20 utilizes a little endian data convention (as is utilized by x86 compatible devices 24 within processor unit 12), data latch 56 will latch the least significant 4 bytes during the first bus cycle and data latch 54 will latch the most significant 4 bytes during the second bus cycle. Thus, input lane B0 of data latch 54 will latch the most significant byte and input lane B3 of data latch 56 will latch the least significant byte of the 8-byte data packet. In other embodiments of the present invention in which processor 20 utilizes a different data convention than the remainder of processing unit 12, interface controller 50 contains logic to convert between big and little endian data conventions by reordering the data bytes. As described above, data latches 54 and 56 are capable of selective byte steering in response to control signals from interface controller 50.

When 8 bytes of data have been latched by data latches 54 and 56, interface controller 50 signals processor 20 that 8 bytes of data are valid to read on data lines 30. Thereafter, processor 20 reads all 8 bytes of data as a single packet from data latches 54 and 56 via data lines 30.

Single beat writes to memory 42 are accomplished by performing essentially the same steps as the above-described read operation, except in reverse. Thus, processor 20 initiates the transaction by transmitting a transaction start (TS) signal to interface controller 50 in conjunction with a valid transaction code and address. Data latches 54 and 56 gate the 8 bytes of data driven on data lines 30 onto data bus 32 under the control of interface controller 50. After performing any necessary conversion to correct for disparate data conventions (e.g., big to little endian conversion), interface controller 50 runs two successive single cycle writes on hybrid bus 28.

The present invention also supports data transfers of fewer bytes than the data width of the system bus. In the preferred embodiment depicted in FIG. 3, in which the data width of hybrid bus 28 is 4 bytes, transactions of four bytes or less may be completed in a single beat of hybrid bus 28. For example, reads of less than 4 bytes are performed much like 8-byte transactions. Processor 20 initiates a load operation by transmitting a transaction start (TS ) signal to interface controller 50 via processor control bus 60 along with a valid transaction code. Next, interface controller 50 asserts the address status signal (ADS) to indicate that a valid address and bus cycle definition are present. Memory 42 then responds by presenting valid data from the specified address on its data pins and transmitting a ready (RDY) signal. Utilizing the transaction code transmitted by processor 20, interface controller enables only the byte lanes within hybrid bus 28 that correspond to valid data. The data is then latched by data latches 54 or 56 and read by processor 20.

In addition to supporting single beat transfers, the present invention supports burst mode transfers by processor 20. In the preferred embodiment of the present invention in which processor 20 comprises a PowerPC™ RISC processor, processor 20 requests 32 bytes in four 8-byte packets when reading data in burst mode. In order to minimize the interface controller logic required to implement the upgrade processor interface, a preferred embodiment of the present invention does not support x86 burst mode data transfers on hybrid bus 28. Consequently, in this preferred embodiment, the x86 burst mode control line (BLAST) is tied low and eight 4-byte single beat read transactions, as hereinbefore described, are performed on hybrid bus 28 to satisfy the burst mode data requirements of processor 20.

In the preferred embodiment in which x86 burst transfers are not supported, processor 20 initiates a burst mode read from memory 42 by transmitting a transaction start (TS) signal to interface controller 50 along with a transfer burst (TBST) signal and a valid address within memory 42. Interface controller 50 then drives address bus 64 with the address asserted on address lines 62 by processor 20. In response to the data request, memory 42 drives the requested data on its output pins. Adaptor 22 then latches the data output by memory 42 and forms 8 byte packets in the manner which has been described. In subsequent beats of the burst, interface controller 50 supplies the correct addresses to memory 42 by incrementing the target address driven on address bus 64 for each of the successive bus transactions. This process results in the transfer of the 32 bytes requested by processor 20 in burst mode in the linear sequence desired by a PowerPC™ RISC processor. It is important to note that in following this process, the described embodiment of the present invention does not follow the non-intuitive byte ordering typical of x86 burst mode read operations. Instead, adaptor 22 supplies the linear burst sequence (e.g., addresses 0, 4, 8, C) expected by the PowerPC™ 60x RISC processor.

Those skilled in the art will appreciate that x86 burst mode support can be achieved. A preferred embodiment of the present invention which utilizes a PowerPC 601 and supports x86 burst mode transfers will now be described. In this embodiment, interface controller 50 executes two 16-byte x86 burst mode reads from memory 42 to satisfy the 32 bytes required by processor 20 in burst mode. Again, processor 20 initiates a burst mode read from memory 42 by transmitting a transaction start (TS) signal to interface controller 50 along with a transfer burst (TBST) signal and a valid address within memory 42. Interface controller 50 then indicates that the bus transaction will be a burst read by a transmitting valid transaction type to memory 42 and by driving BLAST high during the second clock cycle of the transaction. Interface controller 50 also drives address bus 64 with the address asserted on address lines 62 by processor 20 in conjunction with an address status signal (ADS) indicating that the address is valid. In response to the data request, memory 42 drives the requested data on its output pins and transmits a burst ready (BRDY) signal to interface controller 50 to indicate that the data is valid. In response to the BRDY signal, adaptor 22 then latches the data output by memory 42 and forms 8-byte packets in the manner which has been described. Interface controller 50 issues a transaction acknowledge (TA) signal to processor 20 on every other beat of hybrid bus 28 to indicate that processor 20 may read an 8-byte packet of data from data latches 54 and 56.

Interface controller 50 counts the number of 4-byte data packets received from memory 42 by incrementing an address counter comprised of address bits A4, A3 and A2. At the end of the first 16-byte burst on hybrid bus 28, interface controller 50 drives BLAST low during the fourth beat on hybrid bus 28 in response to receiving the third BRDY from memory 42. When address bit A4 changes state, interface controller 50 indicates the beginning of the second 16-byte burst on hybrid bus 28 by again driving BLAST high and asserting ADS in conjunction with a valid target address. At the completion of the second burst on hybrid bus 28 (i.e., at the end of the 32-byte burst mode transfer), interface controller 50 indicates the completion of the transfer by issuing an address acknowledge (AACK) signal to processor 20 on the fourth beat of hybrid bus 28.

Typically, x86 burst mode transfers utilize a nonlinear address sequence, as illustrated in Table 1. However, in the preferred embodiment of the present invention in which processor 20 comprises a PowerPC™ 601 RISC processor, no additional processing is required to reorder the data bytes loaded from memory 42 since the x86 nonlinear burst order correlates to the linear burst sequence of processor 20 at quadword boundaries. That is, since a PowerPC™ 601 RISC processor only issues burst mode transfers at 16-byte boundaries (addresses XXX0h), the x86 burst mode addressing sequence corresponds to the linear addressing order expected by a PowerPC™ RISC processor.

TABLE 1

| 1st Address | 2nd Address | 3rd Address | 4th Address |
| --- | --- | --- | --- |
| 0 | 4 | 8 | C |
| 4 | 0 | C | 8 |
| 8 | C | 0 | 4 |
| C | 8 | 4 | 0 |

Although burst mode transfers have been described with reference to an embodiment in which processor 20 comprises a PowerPC™ 601 RISC processor, those skilled in the art will appreciate that the burst mode requirements of processor 20 are architecture dependant. Accordingly, the number of transfers on hybrid bus 28 required to supply the requested data will vary with the upgrade processor utilized within processing unit 12. Further details of the data transfer modes and signalling protocols utilized by the described embodiment of processor 20 and x86 compatible memory 42 may be found, for example, in *PowerPC™ 601 RISC Microprocessor User's Manual* available from IBM Inc. and *Intel486 Microprocessor Data Book,* Order no. 240440-005, available from Intel Corporation.

Figure 4:
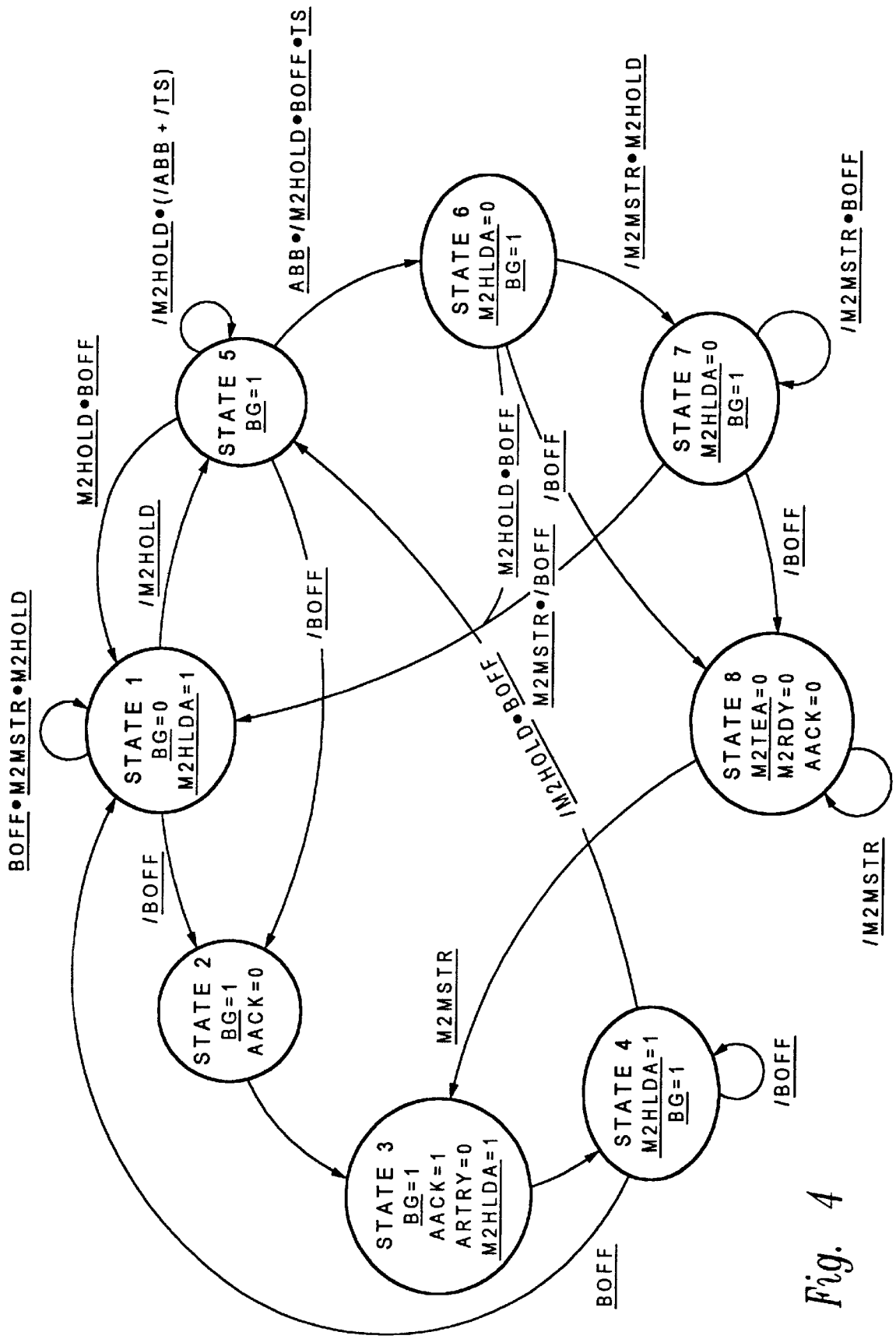
FIG. 4 depicts a state diagram of the method of arbitration employed by the present invention.

Referring now to FIG. 4, there is illustrated a state diagram of the method utilized by the present invention to arbitrate between multiple bus masters having disparate bus acquisition protocols. As depicted in FIG. 2, processing unit 12 includes three bus masters: processor 20, SCSI controller 36, and DMA controller 38. The method of the present invention enables arbitration between processor 20 and SCSI controller 36, both of which have a bi-directional handshaking bus acquisition protocol, and DMA controller 38, which utilizes the uni-directional bus acquisition protocol provided by the x86 processor interface bus. Those skilled in the art will recognize that the state machine depicted in FIG. 4 may be implemented by suitable logic within interface controller 50.

The following list describes the arbitration signals referenced in FIG. 4:

BR(bus request)—Assertion indicates that processor 20 is requesting mastership of the bus.

BG(bus grant)—Assertion indicates that processor 20 may assume mastership of the bus.

ABB(address bus busy)—Assertion indicates that processor 20 is the bus master.

M2HOLD(M2 hold)—Assertion indicates that SCSI controller 36 is requesting mastership of the bus.

M2HLDA(M2 hold acknowledge)—Assertion indicates that SCSI controller 36 may assume mastership of the bus.

M2MSTR(M2 master)—Assertion indicates that SCSI controller 36 is the bus master.

BOFF(back off)—Assertion indicates that DMA controller 38 is the bus master.

An underlined signal name indicates that the signal is active low.

A backslash (/) indicates that the signal is logic low.

While the process is in state 1, control of the system bus is "parked" on processor 20. In this state, the arbitration logic within interface controller 50 behaves as though processor 20 is always asserting a bus request (BR), even though interface controller 50 arbitrates between processor 20 and other bus master devices independent of the state of BR. Typically, bus parking is provided to the device which most often holds bus mastership since arbitration overhead is thereby decreased. Those skilled in the art will recognize that the method of the present invention could be implemented without the bus parked on processor 20. Since processor 20 has been granted bus mastership by interface controller 50 in state 1, processor 20 may initiate a transaction on the bus by asserting transaction start (TS) and address bus busy (ABB) to interface controller 50. Unless interface controller 50 receives a bus request from an x86 device such as DMA controller 38 or another mastering device such as SCSI controller 36, the state machine will remain in state 1.

When interface controller 50 receives a bus request (BOFF) from DMA controller 38, the process proceeds to state 2. At state 2, interface controller 50 terminates the bus grant to processor 20 by inactivating the bus grant signal (BG) and initiates the termination of any cycle in process by activating address acknowledge (AACK). The process then proceeds to state 3, in which interface controller 50 completes the termination by deactivating AACK and activating the address retry (ARTRY) signal for one cycle to instruct processor 20 to retry the current transaction (if one is pending) when processor 20 regains control of the bus. In addition, interface controller 50 turns off the address, data, and control drivers during the transition from state 2 to state 3.

The process then proceeds to state 4, in which DMA controller 38 assumes control of the bus. DMA controller 38 will remain bus master as long as it asserts a bus request (BOFF). When DMA controller 38 terminates its bus request, the state machine will return to state 2 if SCSI controller 36 requests the bus; otherwise, the state machine will return to state 1. Thus, in the depicted embodiment, SCSI controller 36 is awarded a higher arbitration priority than processor 20. Those skilled in the art will appreciate that in other embodiments of the present invention, a bus request by processor 20 may be granted higher arbitration priority than a bus request from SCSI controller 36.

Returning to state 1, if SCSI controller 36 transmits a bus request (M2HOLD) to interface controller 50 while processor 20 is the bus master, the process proceeds from state 1 to state 5, in which interface controller terminates its bus grant to processor 20 (BG=1). The process will remain in state 5 until: (1) interface controller 50 receives a bus request from DMA controller 38; (2) SCSI controller 36 receives a bus grant from interface controller 50; or (3) SCSI controller 36 terminates its bus request. If SCSI controller 36 terminates its bus request at state 5, and no bus request is received from DMA controller 38, the process returns to state 1. If, however, a bus request from DMA controller 38 is received, the process proceeds to state 2 which has been described.

If SCSI controller 36 continues to assert a bus request (M2HOLD), the process proceeds to state 6 if the bus is not busy as indicated by an inactive address bus busy signal (ABB), and no transactions are starting as indicated by an inactive transaction start signal (TS). At state 6 interface controller 50 grants control of the bus to SCSI controller 36 (M2HLDA). If SCSI controller 36 transmits a master signal (M2MSTR) to interface controller 50 and terminates its bus request, the process proceeds from state 6 to state 7, unless DMA controller 38 transmits a bus request. If DMA controller 38 transmits a bus request while the process is at state 6, the process then proceeds to state 8. If, however, SCSI controller 36 does not transmit a master signal to interface controller 50 and terminates its bus request, the process returns to state 1.

In state 7 SCSI controller 36 assumes bus mastership and may perform transactions on the bus as long as it asserts its master signal (M2MSTR) and DMA controller 38 does not transmit a bus request (BOFF). Since processor 20 is assumed to always request the bus, if SCSI controller 36 terminates its master signal, and no bus request is transmitted by DMA controller 38, the process returns to state 1. If, however, DMA controller 38 transmits a bus request while SCSI controller 36 masters the bus, the process proceeds to state 8.

State 8 represents the termination of bus ownership by SCSI controller 36 due to a bus request from DMA controller 38. At state 8, interface controller 50 instructs SCSI controller 36 to abort current bus transactions (M2TEA) and to turn off its address drivers (M2RDY). The state machine remains in state 8 as long as SCSI controller 36 asserts its master signal. When SCSI controller 36 terminates its master signal indicating its release of bus mastership, the process proceeds from state 8 to state 3, which has been described. Since SCSI controller 36 has received an abort/error signal (M2TEA), it will retry the aborted transaction once it regains bus master status.

To simplify the interface of processor 20 to data processing system 10, the above-described method of bus arbitration implicitly assumes that the bus mastering device which controls the address bus also controls the data bus. However, some processors, such as PowerPC™ RISC processors, support bus pipelining to maximize bus utilization. In data processing systems which support bus pipelining, address and data tenures are independent and bus mastering devices must arbitrate for control of the address and data busses separately. Those skilled in the art will appreciate that the method of arbitration of the present invention may also be implemented in systems which employ bus pipelining.

In embodiments of the present invention which utilize processors having internal L1 caches, such as the PowerPC™ 60x RISC processor, L1 cache coherency must be maintained while bus masters other than the processor hold bus mastership. In the preferred embodiment of the present invention depicted in FIG. 3, interface controller 50 transmits a signal (GBL) to processor 20 during bus transactions for which processor 20 is not the bus master. When GBL and appropriate transaction type signals are asserted, processor 20 snoops all transactions as either reads or writes with flush, thereby maintaining cache coherency without the additional overhead generated by supporting shared or modified lines.

The present invention provides an efficient method and system for interfacing a processor which performs transactions utilizing m-byte packets of data to the system bus of a data processing system which performs transactions utilizing n-byte packets of data, where n≦m. In addition, the present invention provides an scheme for arbitrating between multiple bus masters which have disparate bus acquisition protocols. Although the present invention has been described with reference to a preferred embodiment in which a x86 personal computer system having a PowerPC™ 60x upgrade processor, those skilled in the art will recognize that both the data interface and bus arbitration scheme of the present invention may be implemented in a variety of data processing systems. Furthermore, those skilled in the art will appreciate that the description of the preferred embodiment in which an upgrade processor having an 8-byte data width is interfaced to a 4-byte data bus is illustrative, and that the description does not restrict the scope of the present invention to data processing systems having components of those data widths. Finally, those skilled in the art will recognize that the arbitration scheme of the present invention is applicable to a variety of bus master devices that have differing bus acquisition protocols, and is not limited to arbitration between a processor and a DMA controller.

While the invention has been particularly shown and described with reference to a preferred embodiment, it will be understood by those skilled in the art that various changes in form and detail may be made therein without departing from the spirit and scope of the invention.

We claim:

1. A data processing system, comprising:

a processor having an m-byte data width, wherein said processor performs transactions utilizing m-byte packets of data, said m-byte packets of data having a first data convention;

an n-byte data bus, wherein n is less than m, said n-byte data bus conveying n-byte packets of data having a second data convention; and an adaptor having an m-byte parallel interface electrically coupled to said processor and an n-byte parallel interface electrically coupled to said n-byte data bus, wherein said adaptor converts n-byte packets of data input from said n-byte data bus to m-byte packets of data, and wherein said adaptor converts m-byte packets of data input from said processor to n-byte packets of data, such that said processor can transmit in parallel all m bytes of an m-byte packet of data to said n-byte data bus via said adaptor and can receive in parallel, via said adaptor, m bytes of data input from said n-byte data bus;

said adaptor further including a data convention converter that converts input data having said first data convention into output data having said second data convention and input data having said second data convention into output data having said first data convention, wherein if said first data convention is big endian said second data convention is little endian and if said first data convention is little endian then said second data convention is big endian.

2. The data processing system of claim 1, wherein said adaptor comprises:

a plurality of data latches electrically coupled to said n-byte data bus, wherein said plurality of data latches latch, in parallel, n-byte packets of data transmitted to said processor within said n-byte data bus, and wherein said plurality of data latches outputs said data to said processor utilizing m-byte packets output in parallel; and a controller electrically coupled to said plurality of data latches that controls said plurality of data latches.

3. A data processing system, comprising:

a first processor having an m-byte data width, wherein said processor performs transactions utilizing m-byte packets of data, said m-byte packets of data having a first data convention;

an n-byte data bus, wherein n is less than m;

a second processor electrically coupled to said n-byte data bus, wherein said second processor performs transactions on said n-byte data bus utilizing n-byte packets of data, said n-byte packets of data having a second data convention; and an adaptor having an m-byte parallel interface electrically coupled to said first processor and an n-byte parallel interface electrically coupled to said n-byte data bus, wherein said adaptor converts n-byte packets of data input from said n-byte data bus to m-byte packets of data, and wherein said adaptor converts m-byte packets of data input from said first processor to n-byte packets of data, such that said first processor can transmit in parallel all m bytes of an m-byte packet of data to said n-byte data bus via said adaptor and can receive in parallel, via said adaptor, m bytes of data input from said n-byte data bus;

said adaptor further including a data convention converter that converts input data having said first data convention into output data having said second data convention and input data having said second data convention into output data having said first data convention, wherein if said first data convention is big endian said second data convention is little endian and if said first data convention is little endian then said second data convention is big endian.

4. The data processing system of claim 3, wherein said adaptor comprises:

a plurality of data latches electrically coupled to said n-byte data bus, wherein said plurality of data latches latch, in parallel, n-byte packets of data transmitted to said first processor within said n-byte data bus, and wherein said plurality of data latches outputs said data to said first processor utilizing m-byte packets output in parallel; and a controller electrically coupled to said plurality of data latches that controls said plurality of data latches.

5. The data processing system of claim 3, wherein said second processor comprises a direct memory access (DMA) controller.

6. The data processing system of claim 3, and further comprising:

an arbiter that arbitrates between said first processor and said second processor for control of said n-byte data bus.

7. A method of transferring data within a data processing system including a processor having an m-byte data width, an n-byte data bus, wherein n is less than m, a plurality of data latches coupled between said processor and said n-byte data bus, and a device coupled to said n-byte data bus, said method comprising:

in response to said processor initiating a read operation, transmitting data via said n-byte data bus from said device to said plurality of data latches in n-byte packets, said n-byte packets of data having one of a big endian data convention or a little endian data convention;

converting data transmitted to said plurality of data latches by said device between said big endian and little endian data conventions;

latching said data transmitted by said device until m bytes of data have been latched; and following said transmitting, converting, and latching steps, reading said data from all of said plurality of data latches in parallel as an m-byte packet, wherein said processor can receive m bytes of data in parallel from said n-byte data bus via said plurality of data latches.

8. The method of transferring data within a data processing system of claim 7, and further comprising:

in response to said processor initiating a write operation, transmitting m bytes of data in parallel as an m-byte packet from said processor to said plurality of data latches;

latching said m-byte packet of data; and thereafter, transmitting said data via said n-byte data bus to said device in n-byte packets, wherein said processor can transmit data to said n-byte data bus utilizing m-byte packets of data.

9. The method of transferring data within a data processing system of claim 7, wherein said data processing system further comprises a second processor, said method further comprising the step of:

arbitrating between said first processor and said second processor for control of said n-byte data bus.

10. The method of transferring data within a data processing system of claim 7, wherein said step of transferring data in n-byte packets comprises transferring data between said plurality of data latches and said device in n-byte packets utilizing a burst transfer mode in which a plurality of n-byte data packets are transferred in response to said processor specifying a single address.

11. The method of transferring data within a data processing system of claim 8, and further comprising:

converting data transmitted to said plurality of data latches by said processor from one of big endian and little endian to the other of big endian and little endian prior to transmitting said data via said n-byte data bus.

* * * * *